US012693825B2

(12) United States Patent
Du et al.

(10) Patent No.: US 12,693,825 B2
(45) Date of Patent: Jul. 28, 2026

(54) APPLICATION WINDOW TRANSFERRING BETWEEN DISPLAYS

(71) Applicant: Lenovo (United States) Inc., Morrisville, NC (US)

(72) Inventors: Wenyu Du, Beijing (CN); Rod D. Waltermann, Rougemont, NC (US); Jung Hwan Hong, Cary, NC (US); Christopher Smith, Franklinton, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 18/902,702

(22) Filed: Sep. 30, 2024

(65) Prior Publication Data

US 2026/0093428 A1    Apr. 2, 2026

(51) Int. Cl.
  *G06F 3/14*          (2006.01)
  *G06F 3/0481*        (2022.01)
  *G06F 3/0486*        (2013.01)

(52) U.S. Cl.
  CPC .......... *G06F 3/1423* (2013.01); *G06F 3/0481* (2013.01); *G06F 3/0486* (2013.01)

(58) Field of Classification Search
  CPC ..... G06F 3/1423; G06F 3/0481; G06F 3/0486
  See application file for complete search history.

(56) References Cited

U.S. PATENT DOCUMENTS

| | | | |
|---|---|---|---|
| 10,168,980 B2 * | 1/2019 | Sakai | H04L 67/148 |
| 2019/0087202 A1 * | 3/2019 | Reddy Koki | G06F 1/3218 |
| 2021/0096732 A1 * | 4/2021 | Sonnino | G06F 3/04883 |

* cited by examiner

*Primary Examiner* — Lisa S Landis
(74) *Attorney, Agent, or Firm* — FERENCE & ASSOCIATES LLC

(57)          ABSTRACT

One embodiment provides a device, including: presenting, on each of a display of an information handling device and a display of at least one secondary device, a graphical user interface, wherein the presenting comprises presenting at least one visual indicator on the display of the information handling device, wherein the information handling device and the at least one secondary device are paired; receiving, within the graphical user interface, a user input at the at least one visual indicator to transfer a window present within a screen displayed on the display of the information handling device to the display of the at least one secondary device; and transferring, in response to the receiving of the user input, the window present within the screen on the display of the information handling device to the display of the at least one secondary device. Other aspects are claimed and described.

20 Claims, 5 Drawing Sheets

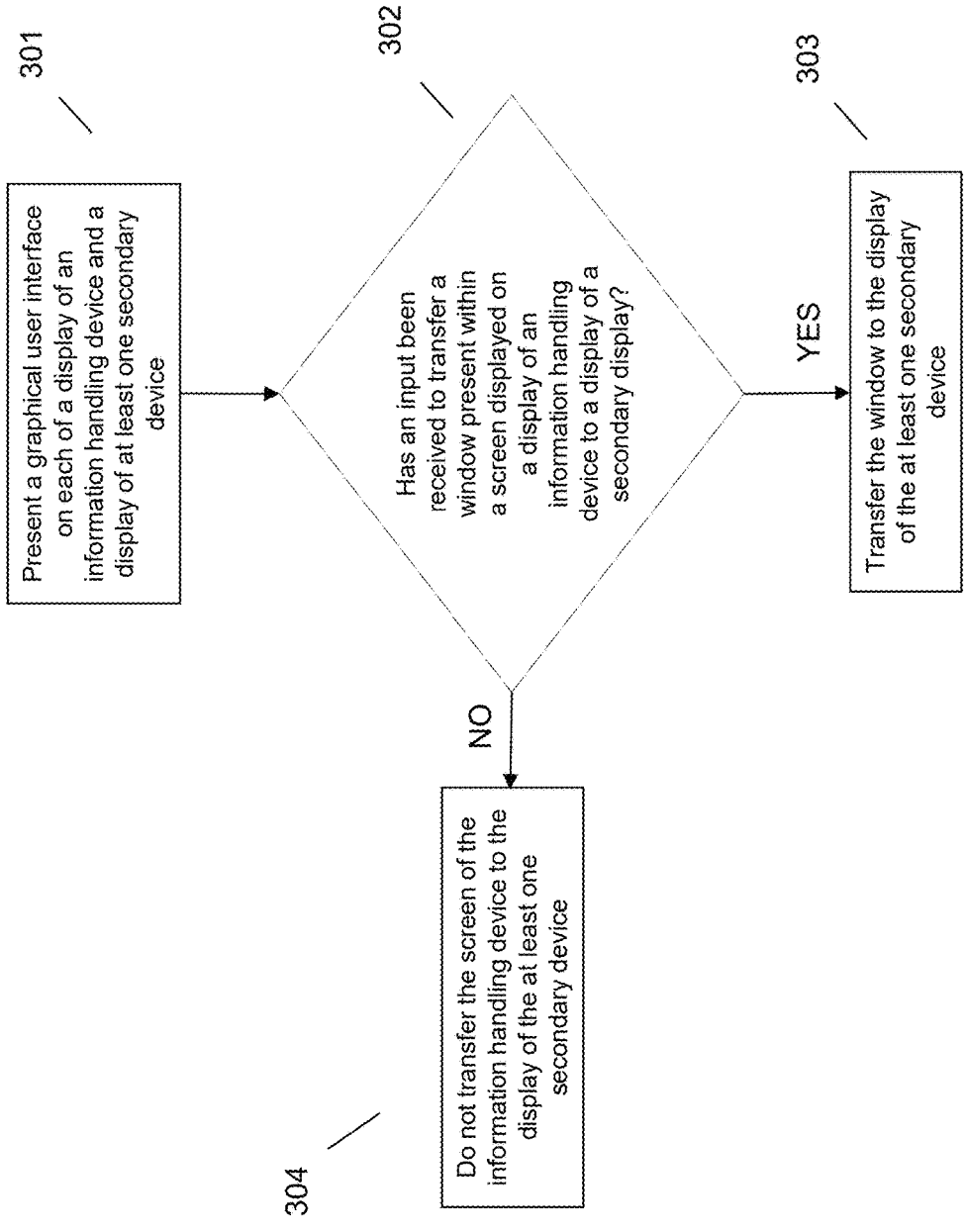

301

Present a graphical user interface on each of a display of an information handling device and a display of at least one secondary device

302

Has an input been received to transfer a window present within a screen displayed on a display of an information handling device to a display of a secondary display?

YES

303

Transfer the window to the display of the at least one secondary device

NO

304

Do not transfer the screen of the information handling device to the display of the at least one secondary device

FIG. 3

APPLICATION WINDOW TRANSFERRING BETWEEN DISPLAYS

BACKGROUND

Multiple display device systems allow a user to view more information than previously permitted. Such systems allow a user to move between items with ease and potentially be more productive with their time. When viewing multiple pieces of data simultaneously, a user may be more engaged with one piece over any additional information being displayed. Additionally, and/or alternatively, a user may desire viewing information at a separate location for sharing, on a larger display for more thorough depiction of information, at a higher quality display, and/or the like. Users may accomplish this by transferring a window present within a screen on one display to another display. This allows the user to view the information that best fits their preferred viewing style.

BRIEF SUMMARY

In summary, one aspect provides a method, including: presenting, on each of a display of an information handling device and a display of at least one secondary device, a graphical user interface, wherein the presenting comprises presenting at least one visual indicator on the display of the information handling device, wherein the information handling device and the at least one secondary device are paired; receiving, within the graphical user interface, a user input at the at least one visual indicator to transfer a window present within a screen displayed on the display of the information handling device to the display of the at least one secondary device; and transferring, in response to the receiving of the user input, the window present within the screen on the display of the information handling device to the display of the at least one secondary device.

Another aspect provides a system, the system including: an information handling device including a display; at least one secondary device including a display; a processor; a memory device that stores instructions that, when executed by the processor, causes the system to: present, on each of the display of the information handling device and the display of the at least one secondary device, a graphical user interface, wherein the presenting comprises presenting at least one visual indicator on the display of the information handling device, wherein the information handling device and the at least one secondary device are paired; receive, within the graphical user interface, a user input at the at least one visual indicator to transfer a window present within a screen displayed on the display of the information handling device to the display of the at least one secondary device; and transfer, in response to the receiving of the user input, the window present within the screen on the display of the information handling device to the display of the at least one secondary device.

A further aspect provides a product, the product including: a computer-readable storage device that stores code that, when executed by a processor, causes the product to: present, on each of a display of an information handling device and a display of at least one secondary device, a graphical user interface, wherein the presenting comprises presenting at least one visual indicator on the display of the information handling device, wherein the information handling device and the at least one secondary device are paired; receive, within the graphical user interface, a user input at the at least one visual indicator to transfer a window present within a screen displayed on the display of the information handling device to the display of the at least one secondary device; and transfer, in response to the receiving of the user input, the window present within the screen on the display of the information handling device to the display of the at least one secondary device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method for transferring a window of an information handling device across a display of at least one secondary device by use of a window transferring system.

DETAILED DESCRIPTION

Figure 1:
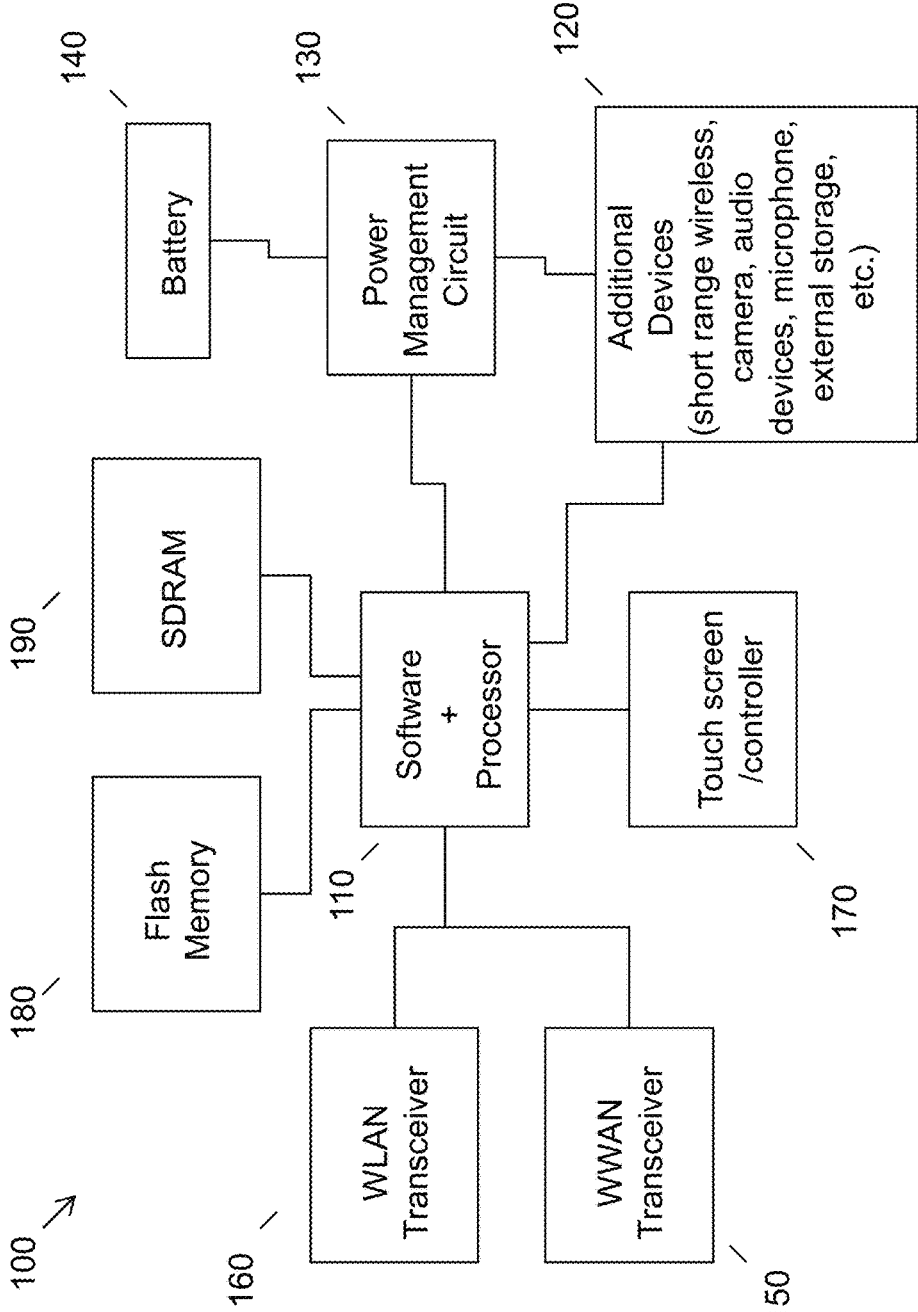
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, transferring a window on a screen of a display of an information handling device to a display of another device paired to the information handling devices requires a user to navigate through display settings of the device. Display, and/or system, settings of a device will commonly provide an order of displays for each paired device, and traditionally allows moving a window present on a screen of an information handling device over to a display of at least one secondary device. This transferring of a window to an additional, and/or secondary, display of another device encompasses an entire secondary device and negates viewing of the display of the secondary device. In other words, transferring a window from one device to another device removes the ability to utilize the display of the secondary device for purposes unique to the secondary device.

Additionally, the conventional approach to transferring a window of an information handling device over another display can hinder productivity of a user interacting with a system because of the complicated process required to perform an extension. Many tedious steps may detour a user from what they are currently working on, resulting in an extended time period away from a task. A conventional method of dragging windows between device displays further promotes inefficiency, particularly when a plurality of items needs to be transferred. What is needed is a system and method that may permit a seamless transferring of a window on a display of an information handling device to at least one secondary device without causing a disruption to work flow.

Accordingly, the described system provides a method for transferring a window present on a screen of an information handling device to a display of at least one secondary device by use of a window transferring system. The window transferring system may present a graphical user interface across the display of each device that have been paired so that they can communicate with each other. The graphical user interface may further include presenting at least one visual indicator on the display of the information handling device. Additionally, and/or alternatively, a visual indicator may also be included on the display of the at least one secondary device. The at least one visual indicator on the display of the information handling device may also indicate a direction in which the display of the at least one secondary device is being treated as an extension of the display of the information handling device. For example, if a visual indicator on the display of the information handling device is present along a right edge of the display, a user may move from a display of the information handling device through the right edge of the display to access the display of the at least one secondary device regardless of actual physical location of the secondary device.

The window transferring system of the information handling device may receive a user input at the at least one visual indicator. A user may desire to transfer a window present on a screen of the information handling device to a display of the at least one secondary device for a variety of reasons, for example, to view information at a larger scale, to place the information on a different display that is viewable to more people, and/or the like. User input received at the window transferring system may include a selection of a visual indicator present on the display of the information handling device and a positioning indicating what window present on the screen of the information handling device to transfer to the display of the at least one secondary device the user desires. The transferring of the window on the screen may be dynamically transferred to encompass a portion the display of the at least one secondary device, and/or may encompass an entirety of the display of the at least one secondary device. Then, upon determining a position of the window included in a received input from the user, the window transferring system may transfer the window on the screen of the information handling device to the display of the at least one secondary device.

Such a system and method provide an improvement over traditional window transferring methods that require accessing system settings and providing tedious input when attempting to transfer a window or a screen to another display. Accordingly, the described system is more user friendly, more flexible, and more efficient than traditional techniques.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors include internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
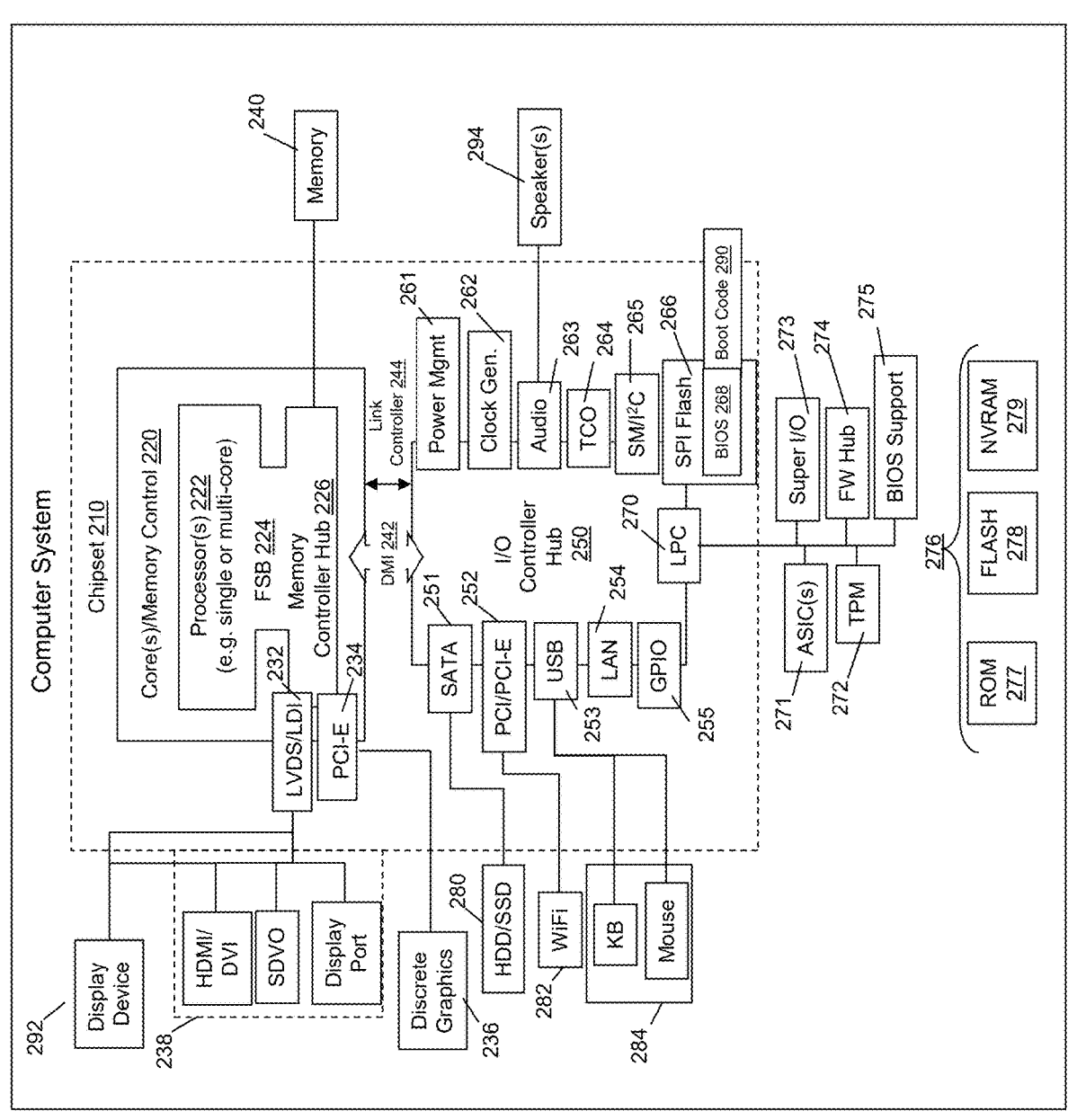
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 include internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may include devices that may be paired with each other. For example, the circuitry outlined in FIG. 1 may be implemented in a tablet and/or personal computer environment, whereas the circuitry outlined in FIG. 2 may be implemented in a personal computer embodiment.

FIG. 3 illustrates an example method for transferring windows between displays through a graphical user interface of a window transferring system. The method may be implemented on a system which includes a processor, memory device, output devices (e.g., display device, etc.), input devices (e.g., keyboard, touch screen, mouse, microphones, sensors, etc.), and/or other components, for example, those discussed in connection with FIG. 1 and/or FIG. 2. While the system may include known hardware and software components and/or hardware and software components developed in the future, the system itself is specifically programmed to perform the functions as described herein to transfer a window present on a screen of an information handling device to a display of at least one secondary device by use of a window transferring system that presents a graphical user interface and then receives a user input at the graphical user interface. Additionally, the window transferring system includes modules and features that are unique to the described system.

Activation of the window transferring system may be a manual activation of the window transferring system and/or an automatic activation of the window transferring system. The automatic activation of the window transferring system may be based upon the detection of a trigger event indicating that the system should be activated.

The window transferring system may be made of multiple systems or modules that communicate together to make up the window transferring system or may be a single system. The window transferring system may be a standalone system, may be accessible through other computing devices, and/or a combination thereof. For example, the window transferring system may be a standalone system that can be accessed by a user and/or may be or provide an application that is accessible by a user on another computing device. The window transferring system may be accessible using any type of computing device, for example, personal computer, laptop computer, smartphone, tablet, smartwatch, head-mounted display, smart television or other smart appliance, augmented reality device, virtual reality device, and/or the like.

Thus, the window transferring system may be a standalone system, may be accessible through other computing devices, and/or a combination thereof. For example, the window transferring system may be a standalone system accessed by a user and/or may be provided as an application that is accessible by a user on a computing device. The window transferring system may be accessible using any type of computing device, for example, a personal computer, laptop computer, smartphone, tablet, smartwatch, smart television, smart appliance, augmented reality device, virtual reality device, and/or the like. The window transferring system may be accessible locally using a computing device where the window transferring system is installed and/or may be accessible remotely through another computing device. However, the window transferring system may be located and operated on an information handling device to perform the described steps.

The window transferring system may utilize one or more artificial intelligence models in presenting a graphical user interface to a user across paired devices, receiving user input at a visual indicator present on one of the paired devices, transferring a window present within the screen on a display of an information handling device to a display of a secondary device, and/or the like. Artificial intelligence models may also be used for steps within a step. For example, a model could be utilized in presenting a graphical user interface and determining an information handling device and at least one secondary device are paired. As another example, a model could be utilized to receive user input at a visual indicator and determine that a positioning of a window at a visual indicator is present upon receiving the user input, detect and analyze user input, and/or the like. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the window transferring system or may be a model that is created from scratch. Since the window transferring system is used in conjunction with transferring a window present within a screen on a display based upon input received from a user, some models that may be utilized by the system are image analysis models, audio analysis models, gesture analysis models, other analysis models, entity identification models, similarity identification models, language models, large language models, filtering models, classification models, and/or the like. The model may be trained using one or more training datasets. Additionally, as the model is deployed, it may receive feedback to become more accurate over time. The feedback may be automatically ingested by the model as it is deployed. For example, as the model is used to perform the described method, if a user modifies predictions that were made by the model, provides feedback regarding a prediction, or otherwise provides some indication that the predictions or selections made by the model may be incorrect, the model ingests this feedback to refine the model.

On the other hand, as the model makes predictions in connection with performing the described steps, and no changes are made to the resulting prediction, the model may utilize this as feedback to further refine the model. This may be referred to as reinforcement training where a prediction that was made by the model is reinforced as the correct prediction. The feedback can also be stored in a data storage location for subsequent training of the model. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The window transferring system may include different components for carrying out different functions of the system, including different steps to be performed. These components may be hardware components or software components. Some hardware components may include sensors (e.g., image capture devices, proximity sensors, microphones, accelerometers, activity trackers, health metric sensors, etc.) that can be used to present a graphical user interface to a user across paired devices, receive user input at a visual indicator present on one of a paired device and transfer a window present within the screen of device to the screen of a secondary device, and/or the like. Other input devices may also be utilized, for example, mechanical input modalities (e.g., keyboard, mouse, etc.), touch input devices, gesture input devices, electromyography input devices, audio input devices, image capture devices, and/or the like. Other hardware components may be utilized to provide output from the screen mirroring system, for example, displays, audio output devices, haptic output devices, and/or the like.

One software component may include a user profile which may be unique to a user and may assist in determining if there is an indication for transferring a window within a screen of an information handling device to a display of a secondary device by use of a window transferring system. For example, the user profile may include information about preferred input methods, what different inputs may indicate, and/or the like. The user may manually input this data into the profile or the information may be populated by the system as the system learns about the user over time. For example, the system may utilize an artificial intelligence model to learn about the user, make correlations between information received from sensors and other inputs and displayed information, identify what different inputs indicate, and/or the like. This information can be populated within the user profile for use by the system during subsequent window transferring determinations. The user profile may also include other information about the user that seems to influence window transferring, for example, the displays or devices paired during a window transferring session, a location of the user during a window transferring session, information being displayed during a window transferring session, and/or the like.

At 301, a graphical user interface associated with a window transferring system may be presented on a display of an information handling device and of a display of at least one secondary device may. The information handling device and the at least one secondary device may be paired devices that work in combination with one another or otherwise communicate with each. Additionally, the devices may be paired so as to permit movement across their associated displays. Accordingly, the display of the information handling device and the display of the secondary device establishes a multiple display system. It should be noted that while two devices and/or displays are discussed herein, an information handling device (referred to as the base device for ease of readability) and a secondary device (referred to as the other device for ease of readability), more than two devices and/or displays can be paired and in communication with each other. Thus, the disclosure is not limited to only two devices as the system can be utilized to work with more than two devices and/or more than two displays.

The window transferring system may include a graphical use interface that may then be presented on the display of the information handling device and the at least one secondary device. The graphical user interface may include presenting at least one visual indicator on the display of the information handling device. It should be noted that part of the graphical user interface may have no visual appearance and may simply be an overlay until some input is received. For example, until input is received at the secondary device, the portion of the graphical user interface displayed on the secondary device display may have no visual characteristics. Thus, it may appear to the user that nothing additional is being displayed on the secondary device display. Alternatively, the portion of the graphical user interface displayed on the secondary device display may be an overlay that is visible to the user, for example, a blurred overlay, a colored overlay, a blinking overlay, an animated overlay, and/or the like. Additionally, or alternatively, the portion of the graphical user interface displayed on the secondary device display may include an icon or other graphic associated with the graphical user interface.

The displayed visual indicator may provide a user with a direction in which a display of the information handling device is paired with a display of at least one secondary device. In other words, a location or appearance of the displayed visual indicator may indicate to the user a position, from a software perspective, of the secondary device display with respect to the base device display. Thus, the visual indicator may not display an actual physical relative location of the secondary device display with respect to the information handling device display, but rather the positioning of the displays as they have been configured in software. Thus, for example, a display could be physically located on a right edge of the base device display, but can be configured to be on the top of the base device display in software.

As another example, if the display of an information handling device depicts a visual indicator along the right edge of the display of the information handling device, the graphical user interface is indicating a software relationship of the base display with a secondary device display through the right edge of the display of the information handling device. Further, using this example, the display of the at least one secondary device may then accept access and/or virtual or digital movement from a user from the base device display through the left side of the secondary device display. Additionally, and/or alternatively, multiple visual indicators may be displayed. Such a situation may indicate a plurality of paired secondary devices to the information handling device and a direction for accessing each secondary device.

A display of the secondary device may include a second visual indicator. Similar to indicating a connection between an information handling device and the at least one secondary device, the second visual indicator present on the secondary device display may indicate a software relationship between the secondary device and the information handling device. For example, if a second visual indicator is located along the left edge of the secondary device display, it may indicate that the information handling device display and the secondary device display are connected along the left edge of the secondary device display and virtual or digital movement between the two displays will occur along this edge. The visual indicator(s) may be of a shape that indicates the devices are paired. For example, the shape of each indicator may be a partial shape (e.g., a semi-circle, part of an arrow, half of a smiley face, etc.) that when viewed together presents a full shape (e.g., a circle, the full arrow, the full smiley face, etc.). As another example, two corresponding or mirrored shapes, for example, two arrows pointing towards an edge of connection, two half-moons with the outer edge of the moon pointing towards an edge of connection, and/or the like. The shape of a visual indicator may assist with illustrating a relationship and the direction of the relationship between the information handling device and the at least one secondary device.

The graphical user interface presented on the display of the information handling device and the display of the at least one secondary device may include presenting an overlay across an input area on the display of the information handling device, and/or the display of the at least one secondary device. For example, the overlay may be a blurred overlay, a transparent overlay, a colored overlay, a flashing overlay, a virtual textured overlay, and/or the like. Thereafter, the graphical user interface is presented to a user over the overlay. The overlay may lock an input area of a display while the graphical user interface is presented. In other words, the overlay ensures that information present on a display may not be modified while the graphical user interface is presented. Additionally, and/or alternatively, the graphical user interface may present the visual indicator(s) on a display of a device without an overlay, but may still lock the input area of a display. Such a use of the graphical user interface may assist with later determining a desired amount of window transferring across a display of the at least one secondary device.

The window transferring system may present the graphical user interface in response to receiving an input for activating the graphical user interface. An input for activating the graphical user interface may include selecting an icon present on the display of the information handling device, detecting a gesture associated with presenting the graphical user interface at the information handling device, automatically presenting a graphical user interface when at least one secondary device is determined to be within a threshold distance or proximity of the information handling device, and/or the like. The window transferring system may utilize one or more sensors coupled to the information handling device in determining when to present the graphical user interface on a display of an information handling device and/or a display of at least one secondary device. When automatically presenting a graphical user interface, at least one sensor of the window transferring system may capture location and/or position data of at least one secondary device. The at least one sensor may include a proximity sensor, global position system sensor, a wireless detection sensor, an electromagnetic field sensor, and/or the like.

Additionally, and/or alternatively, the system may recognize that a user is logged into both devices, that a user profile is associated with both devices, that a user has provided credentials to both devices, and/or the like. The threshold distance amount tracked by components of the window transferring system may be a predetermined distance from the information handling device. The predetermined distance from the information handling device may be established by a manufacturer of a system, configured by a user, learned by the system over time, identified using an artificial intelligence system, and/or the like.

At 302, the system may determine if user input has been received indicating a window present within a screen displayed on the display of the information handling device is to be transferred to the display of the secondary device. In other words, the window transferring system may determine if user input has been received at the at least one visual indicator to move a window or other portion of the screen displayed on the display of the information handling device to the display of the at least one secondary device. Thus, the window transferring system may receive user input at a visual indicator to transfer a window displayed on the display of the information handling device to the display of the at least one secondary device.

Receiving user input at the visual indicator may include tracking user input and interaction with a system while the graphical user interface is present. The receiving the input may cause movement of the visual indicator to the secondary device display. On the other hand, the program window may be moved to the visual indicator and dropped on the visual indicator. This may then cause the automatic transference of the window to the secondary device display. In other words, the user may not have to move the visual indicator to or across the secondary device display. User input may include receiving a selection input at the display of the information handling device, and/or a base display. In the situation where movement of the visual indicator is also performed, the system may thereafter, detect a movement associated with the selection input.

A user input, and/or a selection input, may be performed by use of any human-interface mechanisms (e.g., mouse, keyboard, touchscreen input, stylus, and/or the like). The window transferring system may determine an input is being provided by identifying receipt of selection input within a threshold period of time of performance of the movement (e.g., double clicking before the movement, highlighting before the movement, hovering over the indicator before the movement, etc.), may be a selection input that may be performed in conjunction with the movement or while the selection input is ongoing (e.g., press-and-hold technique, a drag-and-drop technique, a cut-and-paste technique, etc.), and/or the like.

A received user input that includes a selection input separate from the movement may require a user to perform a movement associated with the transferring of the window subsequent to the selection input. For example, the window transferring system may detect a double-click present on the visual indicator displayed on the information handling device, and after detecting the selection input, the movement associated with the selection input may be the moving of a cursor or the visual indicator to the secondary device display. This received user input may require a confirmation input when determining an amount of movement, for example, clicking a location on the display of the at least one secondary device within the threshold period of time, holding the movement at a location for a threshold period of time, providing a secondary input to identify the movement is done, and/or the like. Additionally, and/or alternatively, a confirming input may not be required when, for example, a cursor is present at a desired location on the secondary device display within the threshold period of time. The threshold period of time may be predetermined and may last a few seconds after detecting the selection input at the at least one visual indicator.

Additionally, and/or alternatively, when a received user input includes a selection input that may also include the movement while the selection input is ongoing, the window transferring system may track when the selection input is received at the visual indicator and where the selection input is released, for example, depressing a mouse, stopping a gesture, stopping an audio input, and/or the like, with respect to the display of the at least one secondary device. Rather than requiring the performance of a selection input, a movement, and potentially a confirmation input within a predetermined threshold period of time, utilizing a user input method that includes a selection input, movement and releasing of the selection input concurrently provides an input method that may be performed in one motion and/or step. The window transferring system may accept either version of a user input.

Additionally, the device extension system may receive user input on a base display. The base display may not be the display of the information handling device. As described herein, the base display is routinely referred to as the display of the information handling device but is not limited to being this display. Rather, the base display may be the display of the at least one secondary device, and the received input and associated movement may be initiated at the secondary device display in an attempt to transfer a window from the secondary device display to the display of the information handling device.

In order to provide an indication to the user that the system is recognizing that the user is attempting to move or transfer a window from one display to another, the system may change an appearance of the visual indicator when the window being transferred has been moved to within a predetermined proximity to the visual indicator. For example, the visual indicator may be one shape and then change to a different shape when the window is within a predetermined distance from the visual indicator. As another example, the visual indicator may become animated (e.g., blinking, flashing, spinning, wiggling, etc.) when the window is within a predetermined distance from the visual indicator. As a final, non-limiting example, the color of the visual indicator may change when the window is within a predetermined distance from the visual indicator. Additionally, the system may change the appearance of the visual indicator responsive to receiving the user input so as to indicate that the user input has been received. The appearance changes may be any of the types previously described. These are merely illustrative examples and are not intended to be limiting as other modifications to characteristics or an appearance of the visual indicator are contemplated and possible.

Receiving user input may include receiving additional user input at the visual indicator to reverse a window transference. Receiving user input may include receiving input for transferring a window from one display back to an original base display. The user input received for removing transferred window may be similar to the user input received for performing the original window transfer and/or may be the reverse of the user input received for the original window transfer. For example, after the window has been transferred, the user could provide a selection input to the visual indicator which then reverses the transference. As another example, after the window has been transferred, the user could drag the transferred window back to the base display. Other reversing user inputs are contemplated and possible.

Subsequent to receiving user input at a visual indicator to transfer a window, the window transferring system may determine if the received user input includes movement of the visual indicator or other movement to identify how to transfer the window or where to position the transferred window. How to transfer the window may include identifying whether the transferred window will take up the entirety of the display of the secondary device or only a portion of it, how large the window should be on the secondary device display, and/or the like. Where to position the transferred window may include identifying the location on the secondary device display that the window should be anchored until moved through additional user input. As mentioned previously, detected movement of a received user input may be identified using a variety of techniques. If the window transferring system does not detect a user input at 302, the system may not transfer the window to the secondary device display. Additionally, and/or alternatively, the window transferring system may receive a user input at 302, but fail to detect movement causing the at least one visual indicator to move. In such a scenario, the window transferring system will not extend the screen of the information handling device across the display of the at least one secondary device at 304. Alternatively, the system could transfer the window onto a default location on the secondary device display.

However, when it is determined that user input to transfer a window has been received at 302, the window transferring system may transfer the window to the display of the at least one secondary device at 303. As mentioned previously, transferring the window is performed from a base device to a secondary device. Thus, the secondary device display may be the base device permitting a window of the secondary device display to be transferred to the display of an information handling device. In other words, the base device and base device display is the device and display from which the window is being transferred, regardless of whether that is the information handling device or the secondary device.

Transferring the window to the display of the at least one secondary device may include dynamically transferring the window across the display of the at least one secondary device based upon and in view of the movement associated with the received user input and detected by the window transferring system. Dynamically moving the window includes displaying movement of the window to the secondary device display. This movement may also be in connection with movement of the visual indicator if the window is visually coupled to the visual indicator. In other words, as the visual indicator is dragged or moved across the secondary device display, the window is shown dragging or moving along with the visual indicator across the secondary device display. This can allow the user to see exactly where the window will be positioned on the secondary device display. In other words, the dynamic movement of the window may allow the user to have more granular control of the window transferring location because the user can see the window being moved as the movement is being made.

Additionally, in transferring the window to the secondary device display, the system may adjust the window to match characteristics of the secondary device display. For example, the secondary device display may have different characteristics (e.g., resolution, dots-per-inch density, size, etc.) than the information handling device display. Thus, when the window is transferred from the base display to the secondary device display, if the window maintains the characteristics from the base display, the window may be unviewable on the secondary device display or the user may not like the appearance of the window. The user would then have to provide additional input to modify the appearance of the window. While this technique could be set by the user as the default technique, the user may prefer that the window be adjusted to match the characteristics of the secondary device display. Accordingly, the system may automatically adjust the window to match the secondary device display characteristics so that the window maintains a similar appearance as when it was on the base device display even though it has actually been modified in view of the secondary device display characteristics.

The window transferring system may elect to cancel the transfer of the window to the secondary device display if predetermined parameters are not met by the received input provided by a user. Failing to meet parameters may include, for example, not performing a movement within a predetermined amount of time subsequent to selection, failing to move a visual indicator to an acceptable position for encompassing a predetermined portion of the display of the at least one secondary device, failing to move a visual indicator across the entirety of the display of the at least one secondary device, moving a visual indicator outside of the edges surrounding the display of the at least one secondary device, and/or the like. For example, in response to detecting user input is removed from the visual indicator before the visual indicator is moved to the secondary device display, the window transferring system may cancel the transferring of the window to the secondary device display.

As mentioned above, subsequent to transferring the window to the display of the at least one secondary device, the window transferring system may receive an additional user input at the at least one visual indicator to reverse the window transference. User input that may reverse the transference includes, but is not limited to, selecting the visual indicator and moving the visual indicator back to an edge of the display of the information handling device from the secondary device display, receiving a user input at the visual indicator that may automatically reverse the window transference, receiving a gesture from a user, the user providing an audible command, and/or the like. Receiving a user input at the visual indicator that may automatically reverse the window transference may include, for example, triple-clicking a visual indicator, right-clicking a visual indicator, selecting the "DELETE" key and/or a combination of keys while an extension across displays is present, providing a particular audible input, providing a particular gesture input, and/or the like.

The following paragraphs referencing the remaining figures illustrate the steps taken by a user utilizing a graphical user interface associated with a window transferring system. These illustrations and their descriptions are intended as being non-limiting examples, and are provided in order to assist with understating the system and methods described above. Further, the transferring of a window on a base display of an information handling device to a display of at least one secondary device may be performed utilizing methods not described in these figures.

Figure 4:
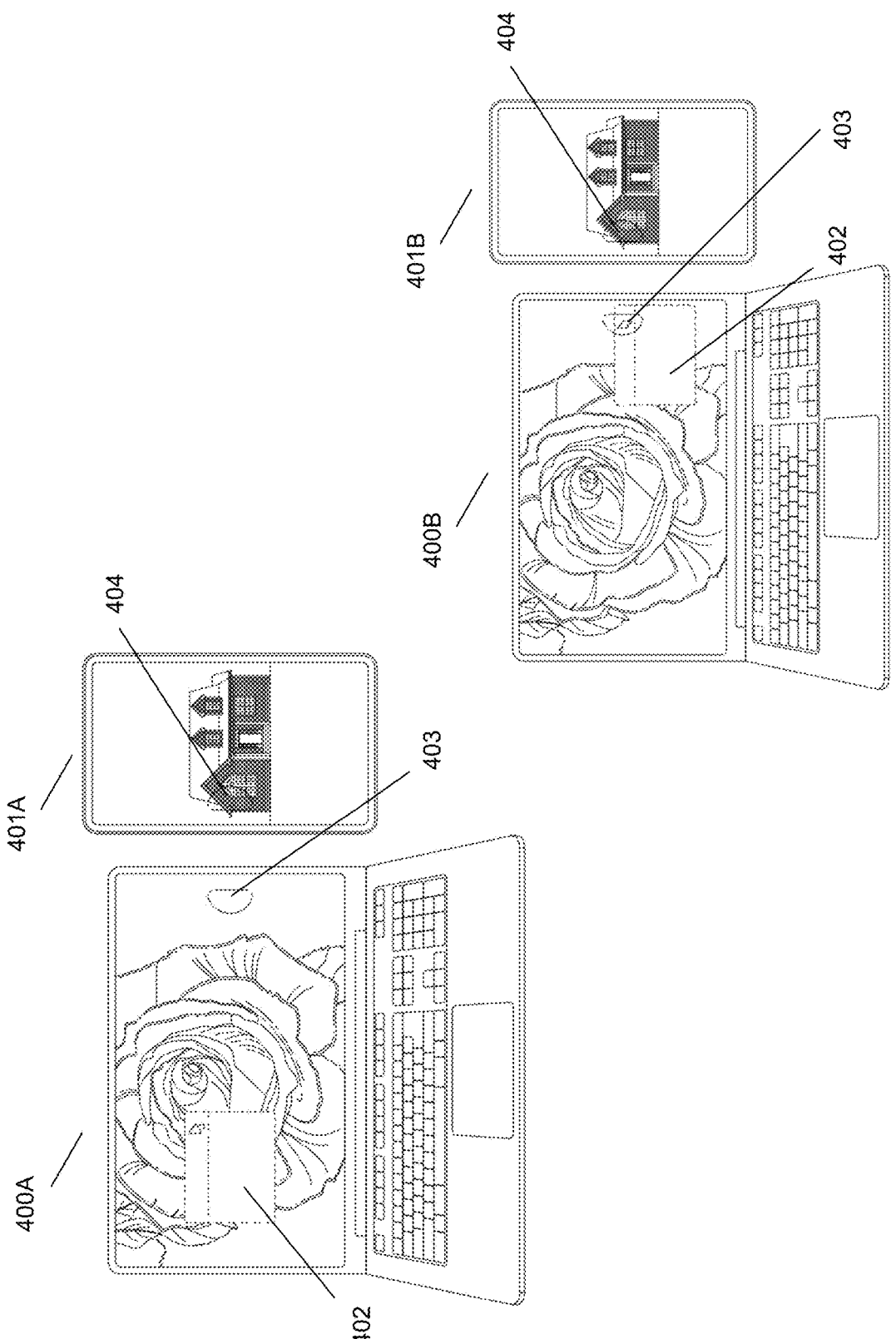
FIG. 4. provides an example illustration of a multiple display setup including two displays presenting a graphical user interface of a window transferring system and receiving a user input at a visual indicator on a display of an information handling device.

FIG. 4 provides an example illustration of a multiple display setup including two displays presenting a graphical user interface of a window transferring system. An information handling device including a display 400A/400B is present, as well as a secondary device including a display 401A/401B. Information handling device 400A/400B and secondary device 401A/401B are paired devices that are within a predetermined threshold distance. A first visual indicator 403 is provided on the display of the information handling device 400A/400B, and a second visual indicator 404 is provided on the display of the secondary device 401A/401B. The presence of the first visual indicator 403 and the second visual indicator 404 establishes that these paired devices are displaying a graphical user interface.

As can be seen in FIG. 4, the shape of the first visual indicator 403 is a semi-circle and is located along a right edge of the display of the information handling device 400A/400B. Similarly, the shape of the second visual indicator 404 is a semi-circle and is located along a left edge of the display of the secondary device 401A/401B. The visual indicators, though including the same shape, are facing opposite directions. As disclosed previously, the location of these visual indicator and/or their shaped orientation may indicate how the paired displays of 400A/400B and 401A/401B are configured within software. For example, a cursor may be moved through the right edge of display of 400A/400b to access the display of 401A/401B from the left edge. Between the two sets of illustrations, the program window 402 is dragged from a first position on the display 400A to a location of the visual indicator 403 on the display 400B.

Figure 5:
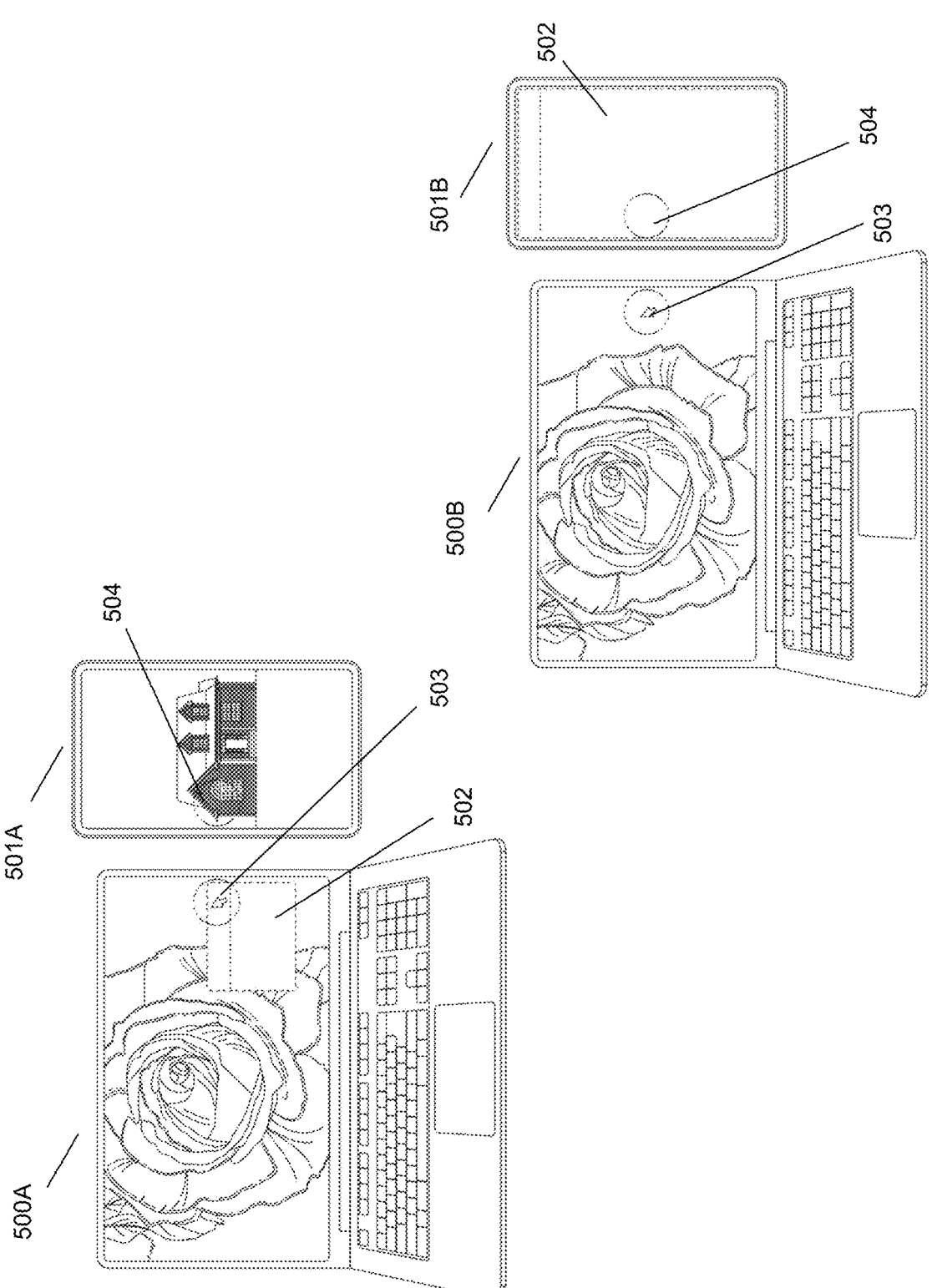
FIG. 5 provides an example illustration of a multiple display setup including two displays receiving a window for transferring at a visual indicator on a screen of an information handling device and transferring the window to a display of a secondary device by use of a graphical user interface of a window transferring system.

Referring to the next figure, FIG. 5 provides an example illustration of a multiple display setup including two displays receiving a window for transferring at a visual indicator on a screen of an information handling device and transferring the window to a display of a secondary device by use of a graphical user interface of a window transferring system. Once the program window 502 (402 in FIG. 4), has been positioned over the visual indicator 503 of the information handling device display 500A, the shape of the visual indicator 503 has changed from the semi-circle of FIG. 4 to a full circle 503. Additionally, the visual indicator 504 on the secondary device display 501A has changed from the semi-circle of FIG. 4 to a full circle 504. This change in appearance of the visual indicator indicates that the window transfer request has been identified. Upon releasing the window 502 over the visual indicator 503, the program window is transferred from the information handling device display 500B to the secondary device display 501B.

The various embodiments present herein provide an improvement over traditional methods for transferring a window present within a screen of an information handling device to the display of another device. Rather than requiring a user to access system settings and/or making manual changes utilizing traditional methods, the described system and method provides a window transferring system that may permit easy window transferring across displays by use of a graphical user interface. A window transferring system may present a graphical user interface of each display of a device paired together, and thereafter, receive a user input at the window transferring system utilizing the graphical user interface to make easy adjustment window locations and positions. This is an improvement over traditional device window transference methods that conventionally require tedious input and/or result in inconsistencies across displays.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

presenting, on each of a display of an information handling device and a display of at least one secondary device, a graphical user interface, wherein the presenting comprises presenting at least one visual indicator on the display of the information handling device, wherein the information handling device and the at least one secondary device are paired, wherein the presenting the graphical user interface comprises presenting an overlay across an input area on the display of the information handling device and presenting the graphical user interface over the overlay;

receiving, within the graphical user interface, a user input at the at least one visual indicator to transfer a window present within a screen displayed on the display of the information handling device to the display of the at least one secondary device; and transferring, in response to the receiving of the user input, the window present within the screen on the display of the information handling device to the display of the at least one secondary device.

2. The method of claim 1, wherein the receiving a user input comprises receiving a user input positioning the window on the at least one visual indicator.

3. The method of claim 2, wherein the receiving a user input further comprises detecting a release of the window on the at least one visual indicator.

4. The method of claim 1, comprising changing an appearance of the at least one visual indicator responsive to the receiving the user input, wherein the changing of the appearance indicates the user input has been received.

5. The method of claim 1, comprising changing an appearance of the at least one visual indicator responsive to detecting the window is within a predetermined proximity to the at least one visual indicator.

6. The method of claim 1, wherein the transferring comprises dynamically transferring the window by displaying movement of the window to the at least one secondary display along with movement of the at least one visual indicator.

7. The method of claim 1, wherein the transferring comprises adjusting the window to match characteristics of the display of the at least one secondary device.

8. The method of claim 1, wherein the transferring is responsive to the window being visually coupled to the at least one at least one visual indicator and being moved from the display of the information handling device to the display of the at least one secondary device.

9. The method of claim 8, comprising cancelling the transferring responsive to detecting the user input at the at least one visual indicator is removed before the at least one visual indicator is moved to the display of the at least one secondary device.

10. A system, the system comprising:
an information handling device including a display;
at least one secondary device including a display;
a processor;
a memory device that stores instructions that, when executed by the processor, causes the system to:
present, on each of the display of the information handling device and the display of the at least one secondary device, a graphical user interface, wherein the presenting comprises presenting at least one visual indicator on the display of the information handling device, wherein the information handling device and the at least one secondary device are paired, wherein to present the graphical user interface comprises presenting an overlay across an input area on the display of the information handling device and presenting the graphical user interface over the overlay;
receive, within the graphical user interface, a user input at the at least one visual indicator to transfer a window present within a screen displayed on the display of the information handling device to the display of the at least one secondary device; and
transfer, in response to the receiving of the user input, the window present within the screen on the display of the information handling device to the display of the at least one secondary device.

11. The system of claim 10, wherein the receiving a user input comprises receiving a user input positioning the window on the at least one visual indicator.

12. The system of claim 11, wherein the receiving a user input further comprises detecting a release of the window on the at least one visual indicator.

13. The system of claim 10, comprising changing an appearance of the at least one visual indicator responsive to the receiving the user input, wherein the changing of the appearance indicates the user input has been received.

14. The system of claim 10, comprising changing an appearance of the at least one visual indicator responsive to detecting the window is within a predetermined proximity to the at least one visual indicator.

15. The system of claim 10, wherein the transferring comprises dynamically transferring the window by displaying movement of the window to the at least one secondary display along with movement of the at least one visual indicator.

16. The system of claim 10, wherein the transferring comprises adjusting the window to match characteristics of the display of the at least one secondary device.

17. The system of claim 10, wherein the transferring is responsive to the window being visually coupled to the at least one at least one visual indicator and being moved from the display of the information handling device to the display of the at least one secondary device.

18. The system of claim 17, comprising cancelling the transferring responsive to detecting the user input at the at least one visual indicator is removed before the at least one visual indicator is moved to the display of the at least one secondary device.

19. A product, the product comprising:
a computer-readable storage device that stores code that, when executed by a processor, causes the product to:
present, on each of a display of an information handling device and a display of at least one secondary device, a graphical user interface, wherein the presenting comprises presenting at least one visual indicator on the display of the information handling device, wherein the information handling device and the at least one secondary device are paired, wherein to present the graphical user interface comprises presenting an overlay across an input area on the display of the information handling device and presenting the graphical user interface over the overlay;
receive, within the graphical user interface, a user input at the at least one visual indicator to transfer a window present within a screen displayed on the display of the information handling device to the display of the at least one secondary device; and
transfer, in response to the receiving of the user input, the window present within the screen on the display of the information handling device to the display of the at least one secondary device.

20. The method of claim 1, wherein the presenting the overlay comprises locking the input area of the display while the graphical user interface is presented;
wherein the overlay across the input area on the display of the information handling device comprises at least one of: a blurred overlay, a transparent overlay, a colored overlay, a flashing overlay, a virtual texture overlay, and an animated overlay.

* * * * *